April 7, 1959  W. E. BENEDICT ET AL  2,880,464
PRECISION COMPENSATING OF CALENDERED SHEETS
Filed Feb. 7, 1958  2 Sheets-Sheet 1

INVENTORS.
WALTER E. BENEDICT
JOSEPH F. DOBRY
BY
ATTORNEY

April 7, 1959 W. E. BENEDICT ET AL 2,880,464
PRECISION COMPENSATING OF CALENDERED SHEETS
Filed Feb. 7, 1958 2 Sheets-Sheet 2

INVENTORS,
WALTER E. BENEDICT
JOSEPH F. DOBRY
BY
ATTORNEY

United States Patent Office 2,880,464
Patented Apr. 7, 1959

2,880,464

PRECISION COMPENSATING OF CALENDERED SHEETS

Walter E. Benedict, Newtown, and Joseph F. Dobry, Langhorne, Pa., assignors to Congoleum-Nairn Inc., Kearny, N.J., a corporation of New York Application February 7, 1958, Serial No. 713,996

13 Claims. (Cl. 18—48.8)

This invention relates to plastic composition sheets useful as surface coverings for floors, walls and the like and in particular to a method and apparatus for creating decorative effects in such plastic composition surface coverings.

Linoleum is a well known resilient surface covering which has been used for almost 100 years as a covering for floors, walls, articles of furniture and the like. Basically, the ingredients used in the production of linoleum today are similar to those in use when it was first discovered and, in general, comprise oxidized drying oils, resins, pigments and fillers. In the production of linoleum, a blend of these ingredients is sheeted by any one of a number of sheet-forming techniques, such as calendering and pressing. The composition sheet is bonded to a backing and subjected to heat for extended periods of time to effect cure of the composition. Linoleum surface coverings are recognized as having long life and durability, good flexibility and resilience, as well as resistance to acids, alkalies and other soiling agents. Linoleum was initially produced in the form of plain colored sheets. Although products of this type are manufactured today, they have been largely displaced by products with more intricate and appealing decorations. It was found at an early date that, if particles of colored linoleum composition were uniformly distributed in a mass of linoleum composition having a contrasting color, attractive products could be produced. During calendering, the colored particles become distorted and smeared to yield long, colored streaks in the product. This effect is well known in the art as jaspe decoration. Jaspe linoleum products are attractive and comparatively low in cost, but have the disadvantage that the decorative streaks penetrate only a small percentage of the thickness of the product and thus the decoration changes during wear since the colored streaks become cut and broken and, in some cases, disappear altogether. In addition, the decorative designs that can be created in this manner are very limited.

Decorative linoleum with a decoration that is essentially non-directional in that it does not show the direction of calendering and which remains unchanged for the life of the installation can be produced by the technique known as geometric inlaying. In this method, sections of the desired shape are cut from a linoleum base sheet and the openings so formed are filled with cut-outs taken from sheets of contrasting colors. The resulting composite sheet is passed through a rotary press to fuse the components together. Since the decorative cut-outs extend the full thickness of the base sheet, it is apparent that the linoleum so produced has the desirable property that the decoration remains unchanged during wear. Such products, however, are expensive to produce. The equipment needed for producing geometric linoleum in commercial quantities represents the investment of several hundred thousand dollars. In addition, in some patterns the cut-outs to be placed in the openings formed in the base sheet can represent as little as 10 percent of the total area of the sheet. The remaining 90 percent of the sheet used in forming the cutouts must be re-mixed and resheeted. This large percentage of reprocessing adds materially to the cost of producing such products. A further disadvantage of this technique is that, for each geometric effect desired, expensive cutting cylinders and dies must be produced.

Attempts to produce a linoleum surface covering having deeply and uniformly embedded, sharply defined, decorative elements on conventional linoleum calendering equipment by depositing the decorative element on the surface of a preformed sheet have failed. When pieces of decorative linoleum composition are added to the surface of relatively thin sheets of linoleum composition and the resulting mass passed between calender rolls with sufficient gauge reduction to embed the pieces into the sheet, the sheet develops wrinkles which get progressively worse and will fold over to cause the sheet to be cut. Theoretically, if the calender rolls are ground to the exact contour to suit the linoleum sheet passing through, such wrinkles and cutting of the sheet will not occur. This, however, is a condition difficult to achieve since the separating forces in the calender nip, which cause the springing of the rolls, are dependent on the thickness of the sheet being calendered, the formulation of the linoleum composition, the age of the composition and the particular operating conditions. In addition, calender rolls are subject to wear and require frequent grinding to insure uniform contours. Even under ideal calendering conditions, it is necessary to have the decorative stock uniformly spread on the surface of the base sheet to prevent wrinkles from developing. It has been found, however, that the application of heavy tension to a sheet as it is fed into a calender has the effect of minimizing the tendency to wrinkle. Linoleum composition does not lend itself to this approach as it will not tolerate any sizeable tension at any temperature without tearing. It is also interesting to note that the reduction of gauge of thick sheets of over 0.37 inch does not result in wrinkles and cutting of the sheet. This is possibly due to the fact that there is sufficient material to absorb any lateral flow or displacement. When making such large gauge reduction, however, any decorative pieces on the surface of the sheet are greatly distorted in shape.

An object of the invention is to produce a decorative plastic composition sheet having essentially a non-directional decoration by the utilizing of conventional calendering equipment. Another object of the invention is to produce a decorative linoleum product which will retain its original decoration through substantial wear. A further object of the invention is to provide a process for commercially producing decorative linoleum sheets which were heretofore unobtainable using calendering equipment. Other objects and the advantages of the invention will appear hereinafter.

In accordance with the invention, it is now possible to embed pieces of plastic composition by calendering into a sheet of soft plastic composition by precision compensating the underside of the plastic sheet as it passes through the calender. This precision compensating is carried out by forcing fine particles or granules of the plastic composition beneath the sheet of plastic composition as it passes into the calender at any point where the sheet is taut thereby eliminating or substantially reducing the tendency of the sheet to wrinkle or buckle. In accordance with the process of the invention, it is possible to embed into the surface of a preformed plastic sheet decorative pieces of plastic composition to produce in a continuous manner a plastic sheet having substantially non-directional decorations.

The invention will be desrcibed with particular reference to the drawings which show one type of apparatus for carrying out the invention.

Figure 1:
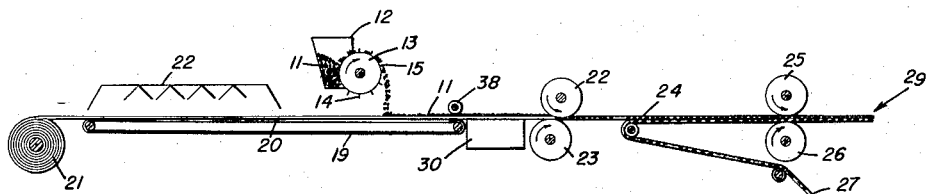
Fig. 1 is a diagrammatic side elevation which is illustrative of one type of apparatus which can be used in the practice of the invention.

With reference to Fig. 1, flat decorative pieces 11 of uncured linoleum composition are maintained in a feed hopper 12. One side of the feed hopper is formed by a rotating drum 13, the circumference of which is divided by a plurality of evenly spaced projections 14 which extend the full horizontal length of the drum. The projections 14 form a plurality of slots 15 for receiving the flat decorative pieces from the feed hopper 12. The feeding device is placed in operation by rotating the drum 13 at a uniform rate whereby the decorative pieces 11 are picked up by the slots 15 from the feed hopper 12 and carried about the circumference of the drum 13 until they fall from the slots onto a sheet of uncured linoleum 20. The sheet of uncured linoleum is supplied from roll 21, and conveyed on a continuous belt 19. The conveyed sheet passes under a heating unit 22 such as infra red lamps, raising the temperature of the sheet to a point where it is calenderable. In lieu of this, the sheet can be supplied directly from a calendering operation in a soft and calenderable condition. The decorative pieces 11 are carried on the heat softened sheet 20 to a calender formed of two rolls 22 and 23 which are preferably both hard surface rolls such as steel rolls. The gauge of the sheet is substantially reduced as it passes between the rolls 22 and 23 and the pieces embedded into the surface of the sheet. The sheet 24 with the embedded pieces then passes to a rotary press having an upper steel roll 25 and one or more back up rolls 26 which press the sheet 24 against a felt sheet 27 supplied from a roll 28 thereby uniting the felt and linoleum sheet. The laminated sheet 29 is then passed into a storage area where the linoleum is cured for a period of about 3 to 4 weeks by holding at approximately 180° F.

Figure 4:
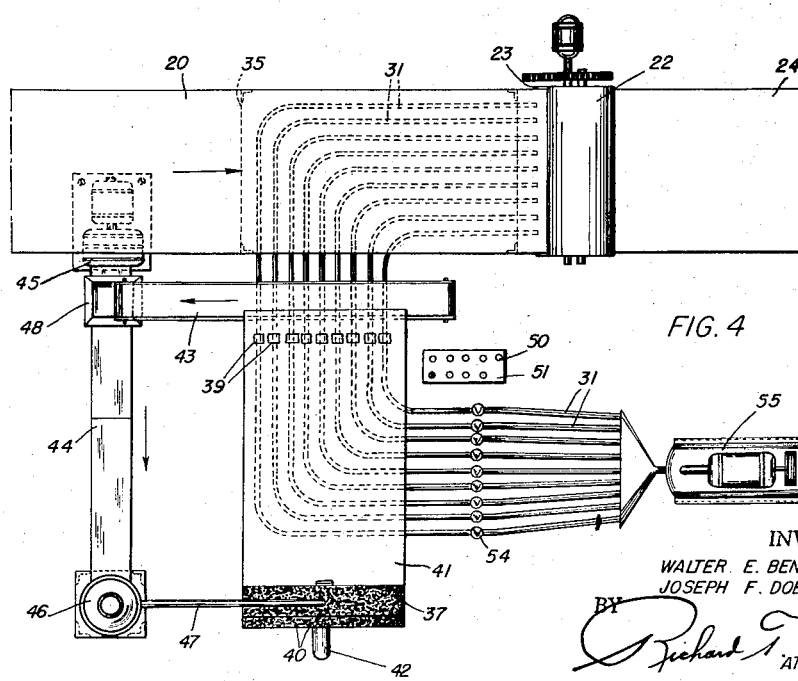
Fig. 4 is a top elevation showing an enlarged view of one form of apparatus for use in accordance with the invention.
Figure 5:
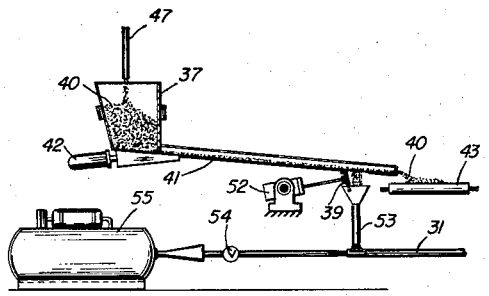
Fig. 5 is a side elevation partly in section showing the apparatus used for feeding the fine granules into the shimming tube.
Figure 6:
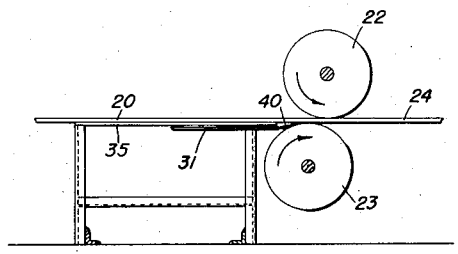
Fig. 6 is a side elevation showing the location of the shimming pipes with relation to the sheet and calender rolls.
Figure 7:
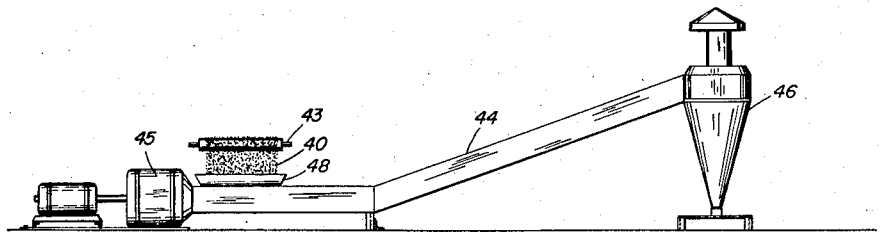
Fig. 7 is an end elevation partly in section showing the apparatus for recycling unused granules of linoleum composition.
Figure 8:
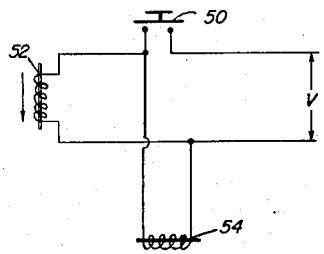
Fig. 8 is a wiring diagram showing the means for operating the apparatus.

Located beneath the sheet 20 as it passes into the first calendering operation is a compensating mechanism 30. The compensating mechanism, as seen in Figs. 4 and 5 comprises a series of parallel pipes 31 at right angles to the calender rolls 22 and 23. These pipes supply fine particles of linoleum composition to compensate the sheet being calendered to prevent the forming of wrinkles in the sheet. The fine particles of linoleum composition 40 are supplied from a feed hopper 37 onto an inclined trough 41 which is continuously vibrated by a vibrating mechanism 42. As the fine particles of linoleum 40 are passed down the trough 41, they pass gate 39 and fall onto a conveyor 43 which deposits them into a recycling air line 44 through an air lock 48. Air is blown through the airline 44 by means of blower 45 and the fine particles of linoleum are conveyed to a cyclone separator 46 which returns them to the feed hopper 37 through pipe 47. When it becomes necessary to compensate the sheet 20 at any particular point along the calender, as indicated by a point of tightness in the sheet, the operator pushes the appropriate electrical contact switch 50 on control panel 51 which operates the corresponding solenoid 52 which opens up gate 39 located in the trough 41 and allows portions of the fine particles of linoleum 40 on the trough 41 to fall into vertical collection pipe 31. At the same time that the contact switch 50 operates gate 39, it also operates an air valve 54 in pipe 31 through a horizontal solenoid and allows air supplied from blower 55 to pass into the pipe 31. The particles are carried by the air stream through the horizontal pipe 31 to the calender. In this manner, the operator is able to supply compensating material to any point along the calender and thereby prevent tight areas from forming by merely touching the appropriate contact switch on the control panel 51. As by way of illustration, it has been found that copper pipe 31 of one inch diameter is particularly suitable using an air pressure of from 30 to 40 pounds per square inch and a calender speed of about 25 to 30 feet per minute.

In another embodiment of the invention, a small pressure roll 38 is used to press the decorative pieces 11 against the base sheet 20 prior to calendering. By using a sheet directly from a forming calender, it is inherently tacky and, therefore, possible, by this means, to adhesively bind the decorative pieces 11 to the base sheet 20 and thereby prevent their displacement as they pass into the calender rolls 22 and 23. This procedure is particularly helpful when the sheet has or develops small wrinkles which would have the tendency to displace the decorative stock.

The composition used to form both the decorative pieces and the base sheet in which they are embedded is any composition which is well known in the art as linoleum composition. Such a composition comprises a blend of oxidized and partially polymerized drying oils, resins, pigments and fillers. Any of the drying or semi-drying oils which are characterized by being oxidized and polymerized to a hard, tough consistency by the application of heat can be used. Such oils as linseed oil, soybean oil, China-wood oil, perilla oil and the like are typical drying oils used in the manufacture of linoleum. Suitable drying oils are characterized by being those in which oxidation yields a substantial amount of the oxidized glycerides of linoleic and linolenic acids. Synthetic drying oils, such as those derived from tall oil and other similar substances, can be used.

In the production of linoleum binder, the drying oils can either be partially oxidized alone and thereafter blended with suitable resins, followed by further oxidation, or the raw drying oils can be blended directly with resins and oxidized in a single stage. The resinous material used is conventionally rosin or its derivatives, such as ester gum and the like; but other resinous materials, such as Congo ester, coumarone resins, kauri gum, synthetic resins of the phenol-formaldehyde type and the like can be used. During the oxidation process, it is conventional that small proportions of metallic dryers, such as the metallic salts of lead, manganese and the like, be used.

At the conclusion of the oxidation, which by the single stage process normally requires from 12 to 30 hours at a temperature of 180° F., the mass of oxidized drying oil and resin is withdrawn from the kettle in the form of a rubber-like gel. This mass, after being cooled, is mixed with pigments and fillers to produce the linoleum composition. The filler content will normally comprise a mixture of vegetable fillers, such as cork, wood flour and the like and mineral fillers, such as whiting, clay, asbestos and the like. The composition is pigmented using conventional organic or inorganic pigment, according to the particular color desired. Conventional linoleum compositions will normally comprise from 25 percent to 50 percent by weight of a blend of drying oil plus resin (normally referred to as linoleum binder) and from 50 percent to 75 percent by weight of pigments and fillers. The resin content of the linoleum binder is normally between 15 percent and 35 percent by weight of the amount of drying oil plus resin.

The composition produced as described above is sheeted in the conventional manner, such as by calendering or pressing. Various conventional decorative effects can be created in the resulting sheets in accordance with the well-known techniques of the prior art, that is, both the base sheet and the sheet from which the decorative pieces are to be cut can be either plain or formed in the jaspe, marbleized or other well known decorative effects of the prior art.

The decorative linoleum composition which is to form the decorative elements of the finished product produced in accordance with the invention is in the form of flat pieces of linoleum composition. The pieces can be in the form of regular geometric shapes, such as rectangles, squares, triangles and the like, or they can be in the form of irregularly shaped pieces. The pieces can be produced in any suitable way, as by cutting or breaking a preformed sheet or by transversely slicing a rolled up or folded sheet or an extruded body whose cross section has the desired shape. In order that the pieces can be readily embedded into the base sheet without appreciable distortion of either the base or the sheet, pieces should not have an area of greater than about 2¼ square inches. Pieces of this size or smaller can be embedded in the base sheet in accordance with the invention with only a minimum amount of lateral or longitudinal displacement of the base sheet. Where pieces of larger size are used, considerable flow of the base sheet can occur during the embedding operation. Such flow is not desirable where a product having a smooth surface is to be produced. The use of flat pieces having a surface area of ¼ square inch or less is particularly effective.

The thickness of the decorative pieces is related to the thickness of the base sheet into which they are embedded. Conventionally, linoleum is produced in three different gauges with a thickness of wear surface ranging from 0.32 inch to 0.085 inch. For satisfactory embedding of pieces into a base sheet in accordance with the invention, the pieces preferably have a thickness which is less than that of the thickness of the finished sheet. Since the thickness of the pieces represents substantially the depth of the decorative effect produced in the finished product, it is normally preferred in producing products having the optimum wearing qualities that pieces be used which are as thick as can be satisfactorily embedded. It is preferred that pieces having a thickness between ⅓ and ¾ of the thickness of the finished sheet be used.

In creating decorative effects in linoleum in accordance with the invention, the pieces are normally sprinkled on a base sheet in a random fashion. This means that the pieces will tend to land with the face bearing the largest area in the upright position. Consequently, for proper control of decoration, it is essential that the relative dimension of the pieces be controlled so that the desired face lands upright substantially all the time during the feeding. This requires that the minimum face dimension of the piece be at least 1.5 times the thickness of the piece. For example, where pieces are to be embedded into a sheet to produce a standard gauge linoleum base sheet having a thickness of 0.052 inch, the pieces should be from .018 to .038 inch in thickness. Thus, in this case the minimum face dimension of the pieces should be from .027 to 0.057 inch.

In a preferred embodiment of the invention, the pieces are chilled prior to being embedded in the base sheet. A convenient way of measuring the physical properties of linoleum to determine the degree of chilling necessary in the production of products in accordance with the invention is to subject chilled linoleum composition in sheet form to a controlled pressure over a limited surface area for a definite length of time. The extent of the penetration of the object into the composition in such a test is an inverse function of the hardness of the com-position. It is preferred in producing products in accordance with the invention that the pieces be refrigerated until they show a penetration of less than about 12 percent of the thickness of the composition. In the carrying out of the penetration test, a 0.25 inch diameter smooth metal cylinder is placed upon a sample of a linoleum composition sheet and a weight of 6 pounds is applied for a period of 60 seconds. This corresponds to a pressure of 122.4 pounds per square inch. The sheet is refrigerated and is maintained at a controlled temperature during the test. At the end of 60 seconds, the amount of penetration of the cylinder into the sheet is measured. When a conventional Randall and Stickney dial gauge is used, the amount of penetration can be read directly on a dial at the conclusion of the test. The actual penetration divided by the thickness of the sheet is the percentage penetration at the temperature of the sheet during the test. The term percentage penetration as used in the specification and claims refers to the result of a determination made by the method outlined above. Pieces of linoleum composition refrigerated to show a percentage penetration of between 4 percent and 10 percent are particularly effective in the production of products in accordance with the invention.

In accordance with the invention, a base sheet of linoleum composition must be in a calenderable condition prior to the deposition of the pieces thereon. The base sheet is formed from linoleum composition in the conventional manner and can be decorated with any of the conventional effects of the prior art. Thus, the base sheet can be not only a plain colored sheet, but can be formed with a jaspe, marbleized or any other conventional decoration. The sheet, if necessary to produce a calenderable sheet, is heated by conventional means, as for example by radiant heating elements or in a forced air convection type oven. The sheet should show a percentage penetration of at least about 80 percent. The penetration percentage is determined in the manner described in connection with the pieces. That is, a force of 6 pounds is applied for 60 seconds to a 0.25 inch diameter cylinder, one end of which is resting on the heated sheet. The distance of the cylinder penetrates the sheet, divided by the thickness of the sheet, is the perecntage penetration. Base sheets showing a percentage penetration of between 80 percent and 90 percent are particularly effective for use in the invention. Linoleum composition sheets heated to a temperature of about 110° F. normally show a percentage penetration of about 80 percent and at a temperature of 160° F., a percentage penetration of 90 percent. Base sheets showing a percentage penetration of greater than 90 percent can be used, but are not as satisfactory. The relatively higher temperature of such sheets can cause excessive heat transfer to the decorative pieces resting thereon prior to embedding with the result that the decoration in the product tends to become smeared due to undue softening of the pieces. The base sheet composition should have about the same curing characteristics as that of the composition used to form the pieces. The use of highly aged, hard composition for formation of pieces and fresh soft compostion for formation of the base sheet is undesirable, since uniform cure of the product could not be obtained. As a general rule, the greater the gauge reduciton the greater the pressure and, therefore, the better the embedding. A gauge reduction to about ¾ to ¼ of the original thickness has been found particularly effective although higher and lower gauge reductions can be used. As an illustration, a sheet having a thickness of 0.07 inch can be calendered to produce a sheet having a thickness of 0.05 inch.

The step of heating the base sheet of linoleum composition is not always necessary. For example, where the sheet has just been formed by calendering or pressing, it frequently will be at the correct temperature for proper embedding of pieces in accordance with the invention when it leaves the sheet-forming step.

Figure 2:
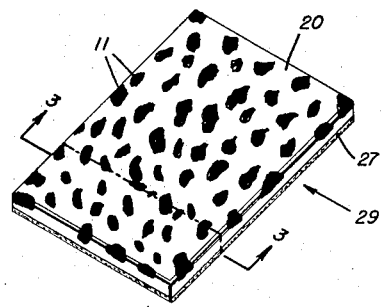
Fig. 2 is a perspective view of one form of the product produced in accordance with one form of the invention.
Figure 3:
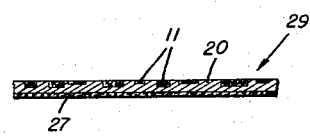
Fig. 3 is a fragmentary cross section of the product of Fig. 2.

When the base sheet has attained the temperature required for it to show the desired penetration percentage, as outlined above, the pieces are embedded therein. As illustrated in Fig. 1, the pieces are sprinkled upon the heated base sheet in an amount conforming to the decoration desired. In the production of a product having a random type decoration, as shown in Fig. 2, the rate of feeding of the pieces can be synchronized with the rate of motion of the base sheet to insure even distribution of the pieces over the surface of the moving base sheet. Various distribution devices, such as screens, baffles and the like, can be interposed between the base sheet and supply of falling pieces to slow down the rate of fall of the pieces and to aid in the attainment of uniform distribution. The quantity of pieces to be used compared to the base sheet is governed by the density of decorative elements desired in the product. Normally, products having from about 15 percent to about 50 percent of the surface area representing decorative elements formed from embedded pieces are particularly attractive. Another particularly suitable decoration is formed by completely covering the base sheet with fine particles and then scattering larger chips of pieces on top of the fine particles. In some cases where a more regular decorative effect is desired, the pieces can fall through travelling stencils, with the result that only certain defined areas of the base sheet are covered. Other novel decorations can be obtained by depositing fine particles on the surface of the base sheet and then displacing some of them to show the base sheet by pulling a brush through the particles. The calendering can be carried at various temperatures, but it is preferable to have the roll contacting the surface of the sheet at a temperature of less than 80° F. The opposite roll is usually heated to about 130° to 190° F. The fine particles of composition used for compensating the composition sheet can be of any conventional size. It is preferred to use particles having a size ranging from about 0.03 to about 0.15 inch in diameter with a size range of from 0.05 to 0.08 inch being preferred. The smaller the particles the harder to produce and the larger the particle the more danger of producing a non-uniform sheet due to irregularities on the back of the sheet.

Linoleum composition in sheet form must be bonded to a strengthening backing prior to cure of the composition to produce finished linoleum. The backing is an essential element in the finished product since it imparts to the product the ability to withstand strains resulting from handling the product during installation. In addition, the backing is necessary since uncured linoleum composition is relatively weak and soft and linoleum composition sheets hung in curing ovens without a backing would invariably tear and break. Backings of woven fabric, such as burlap, cotton and the like, or felted fibrous sheets are well known in the linoleum art. Felted fibrous sheets, prepared from fibrous materials on a web-forming machine, such as a Fourdrinier or cylinder machine, are ideal backing sheets for linoleum if impregnated with a waterproofing and strengthening saturant. Such saturants as asphalt, thermoplastic resins such as polyvinyl acetate, coumarone resins, and the like, elastomeric resins, such as rubber, butadiene-styrene copolymer, polymerized chloroprene and the like, and thermosetting resins, such as phenolformaldehyde resin, oxidized natural and synthetic drying oils and the like can be used.

The invention has been described with reference to a single embedding operation. Unusual decorative effects can be created, however, by embedding pieces of linoleum in a series of separate operations. It is apparent an extremely wide variety of decorative effects can be created in accordance with the invention by varying the shape of the pieces to be embedded or by using controlled embedding steps.

The process of the invention permits the embedding of large decorative pieces into a base sheet to produce designs which heretofore could not be obtained by calendering. In addition, the combination of decorative base sheets with decorative pieces makes it possible to produce an unlimited number of designs. It is not necessary to embed all the pieces into the base sheet without altering their appearance. Particularly desirable results are obtained in some cases by allowing the pieces to be distorted in primarily one direction so that an elongated appearance is obtained.

The final calendered product is then stoved or cured in the manner conventionally used in the manufacture of linoleum surface coverings. Conventionally, the product is hung in long loops in large ovens or stoves and held at a temperature of about 140° F. to about 180° F. for a period of about three to four weeks. The cured product removed from the stove can be used in the form of sheets or can be cut up into tiles or other appropriate shapes as desired. After curing, the product can be bonded to a resinous foam backing, such as foam rubber or a foamed vinyl resinous composition where a product with high resilience is desired.

Although the invention has been described with particular reference to linoleum composition sheets to which it is most applicable, the process can also be utilized with plastic sheets or other compositions such as synthetic resinous compositions, i.e. vinyl compositions or the like when it is desirable to overcome or prevent bagginess, and similar characteristics while calendering sheets.

Any departure from the above description which conforms to the present invention is intended to be included within the scope of the claims.

What is claimed is:

1. An apparatus for producing a smooth sheet of plastic composition having decorative pieces of plastic composition embedded in its surface which comprises calendering means for forming a base sheet of plastic composition, distributing means for placing the decorative pieces on the surface of the base sheet, a second calendering means for embedding the decorative pieces into the base sheet, conveying means for carrying the base sheet from the first calendering means to the second calendering means, means for exerting pressure on said calender rolls to reduce the gauge of the sheet as it passes between the calender rolls, means for forcing fine particles of plastic composition beneath the sheet as it passes into the second calendering means at spaced points across the nip of the second calendering means thereby preventing bagginess from developing in the sheet.

2. An apparatus for producing a smooth sheet of linoleum having decorative pieces of linoleum composition embedded in its surface which comprises calendering means, means for conveying a sheet of linoleum composition to said calendering means, distributing means for placing decorative pieces of linoleum composition on the surface of the base sheet while being carried by said conveying means, means for exerting a predetermined pressure at the nip between the rolls of said calendering means for reducing the gauge of the linoleum sheet and embedding the decorative pieces into the surface of the sheet, means for forcing fine particles of linoleum composition beneath the sheet as it passes into the nip of said calendering means at spaced points across the nip thereby preventing bagginess from developing in the sheet.

3. The apparatus of claim 2 wherein said means for forcing fine particles comprises a series of pipes spaced across the nip of said calendering means, means for placing the fine particles into said pipes and means for blowing air into the pipes to force the particles through said pipes and into the nip of said calendering means.

4. The apparatus of claim 3 wherein said means for placing the fine particles into said pipes comprises an inclined vibrating trough, means for supplying the fine particles to the vibrating trough, conduits between said trough and said pipes and means for regulating the flow of the fine particles from said trough to said conduits.

5. In a method for producing a smooth sheet of plastic composition having decorative pieces of plastic composition embedded in its surface by passing a sheet of plastic composition having decorative pieces on its surface through a calender whereby the gauge of the sheet is reduced and the decorative pieces embedded in the surface of the sheet, the improvement which comprises forcing fine particles of compatible plastic composition beneath the sheet as it enters the nip of said calender at points of tautness of the sheet.

6. In a method for producing a smooth sheet of linoleum having decorative pieces of linoleum composition embedded in its surface by passing a sheet of uncured linoleum having decorative pieces on its surface through a calender whereby the gauge of the sheet is reduced and the decorative pieces embedded in the surface of the sheet, the improvement which comprises forcing fine particles of linoleum beneath the sheet as it enters the nip of the calender at points of tautness of the sheet.

7. The process of claim 6 wherein the fine particles of linoleum range in size from about 0.03 to about 0.08 inch.

8. The process of claim 6 wherein the decorative pieces on the base sheet prior to calendering have an area of less than 2¼ square inches.

9. The process of claim 6 wherein the base sheet is reduced in gauge to between ¾ and ¼ of its original thickness during the calendering.

10. The process of claim 6 wherein the decorative pieces are from about ⅓ to about ¾ of the thickness of the base sheet prior to calendering.

11. The process of claim 8 wherein the decorative pieces cover about 5 to about 25 percent of the surface of the base sheet.

12. A process for producing a smooth sheet of linoleum composition having decorative pieces of linoleum composition embedded in its surface which comprises calendering uncured linoleum composition to produce a sheet, depositing pieces of uncured linoleum composition having an area of less than 2¼ square inches and a thickness of from about ⅓ to about ¾ of the thickness of the sheet on the surface of the sheet, calendering the sheet and decorative pieces to reduce the gauge of the sheet to about ¾ to about ¼ of its original thickness thereby embedding the decorative pieces into the sheet and during such calendering forcing fine particles of linoleum composition beneath the sheet covered with decorative pieces as it enters the nip of the calender at points of tautness of the sheet.

13. The process of claim 12 wherein said fine particles of linoleum have a diameter of from about 0.03 to about 0.15 inch.

References Cited in the file of this patent

UNITED STATES PATENTS

| | | |
|---|---|---|
| 2,175,337 | Boice | Oct. 10, 1939 |
| 2,317,447 | Domizi | Apr. 27, 1943 |

FOREIGN PATENTS

| | | |
|---|---|---|
| 923,172 | Germany | July 25, 1955 |